United States Patent Office 3,453,225
Patented July 1, 1969

3,453,225
POLYVINYL CHLORIDE RESIN STABILIZER SYSTEMS AND RESIN COMPOSITIONS STABILIZED THEREWITH
Mark W. Pollock, Teaneck, N.J., assignor to Argus Chemical Corporation, Brooklyn, N.Y., a corporation of New York
No Drawing. Continuation-in-part of application Ser. No. 217,298, Aug. 16, 1962. This application Sept. 9, 1965, Ser. No. 486,196
Int. Cl. C08f *45/62, 29/18*
U.S. Cl. 260—23               18 Claims This application is a continuation-in-part of earlier copending application Ser. No. 217,298, filed on Aug. 16, 1962, and abandoned on Sept. 12, 1965.

This invention relates to polyvinyl chloride resin stabilizer systems comprising mixed alkali metal salts and polyvalent metal salts of organic carboxylic acids and a polyhydric alcohol, and to a process for the stabilization of polyvinyl chloride resins against heat deterioration, and to polyvinyl chloride resins so stabilized.

It is well known that polyvinyl chloride resins deteriorate rapidly upon exposure to elevated temperatures, such as the temperatures conventionally used for processing. To prevent this, stabilizers are now widely used. The organotin compounds are probably the best single stabilizers for this purpose, but they are relatively expensive, and impart undesirable odors in many cases.

Polyvalent metal salts of organic acids also are widely used as stabilizers, either alone or in admixture with auxiliary stabilizers. The basic patent in this field is Leister et al., No. 2,564,646, which made it possible for polyvalent metal salts of organic acids to equal the organotin compounds in effectiveness by combining them with organic phosphites, sulfides, or hindered phenols. Such compounds have largely supplanted the organotin compounds in this area for many years.

Other mixtures have been proposed, but are not really as effective as the Leistner et al. systems. For example, Patent No. 2,711,401, issued June 21, 1955, to Lally discloses the use as stabilizers of a mixture of a polyvalent metal salt of a saturated or unsaturated acid with a polyhydric alcohol. These mixtures are, however, demonstrably inferior to the phosphite-salt combinations, and are comparable thereto only if a phosphite also is included. Such mixtures, especially tailored for nontoxic applications, are described in Patent No. 3,003,999 to Kauder and Perry (sorbitol, a zinc salt and calcium salt of a fatty acid), Patent No. 3,003,998 to Kauder and Perry (calcium benzoate, a zinc fatty acid salt and glycerol) and Patent No. 3,004,000 (sorbitol, a calcium or zinc benzoate and a calcium or zinc fatty acid salt).

In accordance with this invention, mixtures of polyvalent metal and alkali metal salts of organic acids are provided which, with a polyhydric alcohol, are better capable of stabilizing polyvinyl chloride resins than the polyvalent metal salt-polyol combinations alone. This stabilizing effectiveness is surprising, inasmuch as the alkali metal organic acid salts alone or with a polyhydric alcohol are not effective, and the polyvalent metal organic acid salt-polyhydric alcohol combinations are not as effective, in comparison. Thus, the stabilizing effectiveness of the stabilizer systems of the invention is greater than that contributed by any of the components individually, or by any two of the three components taken together.

Broadly, the stabilizing combinations of the invention comprise a polyhydric alcohol, an alkali metal salt of an organic mono or poly carboxylic acid, and a polyvalent metal salt of an organic mono carboxylic acid, and preferably an aromatic acid. It will easily be seen from the foregoing, that by selecting nontoxic polyvalent metals, such as for example, zinc salts, nontoxic alkali metal salts, and nontoxic polyhydric alcohols, such as, for example, glycerol, mannitol, pentaerythritol and sorbitol, nontoxic polyvinyl chloride resin food packaging materials can be obtained.

The alkali metal salts employed in this invention are lithium, sodium, potassium, rubidium and cesium salts of organic carboxylic acids having from two to about thirty carbon atoms. Mixed acids and mixed alkali metal salts can be used.

Aliphatic, aromatic, cycloaliphatic and oxygen-containing heterocyclic mono and poly carboxylic acids are operative, as a class. The acids may be substituted, if desired, with groups such as halogen, sulphur, and hydroxyl. The oxygen-containing heterocyclic acids include oxygen and carbon in the ring structure, of which alkyl-substituted furoic acids are exemplary. As exemplary of the acids there can be mentioned the following: caproic acid, capric acid, 2-ethyl hexoic acid, enanthic acid, caprylic acid, pelargonic acid, hendecanoic acid, lauric acid, tridecanoic acid, pentadecanoic acid, margaric acid, arachidic acid, heneicosanoic acid, behenic acid, tricosanoic acid, tetracosanoic acid, pentacosanoic acid, cerotic acid, heptacosanoic acid, octacosanoic acid, nonacosanoic acid, and triacontanoic acid, suberic acid, azelaic acid, sebacic acid, brassylic acid, thapsic acid, 2-proply-1,2,4-pentanetricarboxylic acid, chlorocaproic acid, hydroxy capric acid, stearic acid, hydroxy stearic acid, palmitic acid, oleic acid, linoleic acid, myristic acid, oxalic acid, adipic acid, succinic acid, tartaric acid, α-naphthoic acid, dodecyl thioether propionic acid $C_{12}H_{25}$—S—$(CH_2)_2$—COOH, hexahydrobenzoic acid, benzoic acid, phthalic acid, phenylacetic acid, terephthalic acid, glutaric acid, monomethyl succinate, isobutyl benzoic acid, monethyl ester of phthalic acid, ethyl benzoic acid, isopropyl benzoic acid, ricinoleic maleic acid, fumaric acid, monoethyl maleate, p-t-butyl-benzoic acid, n-hexyl benzoic acid, salicylic acid, β-naphthoic acid, β-naphthalene acetic acid, orthobenzoyl benzoic acid, naphthenic acids derived from petroleum, abietic acid, dihydroabietic acid, and methyl furoic acid.

The mixed fatty acids derived from edible fats and oils such as the mixed fatty acids derived from tallow, coconut oil, cotton seed oil, soybean oil, corn oil and peanut oil are particularly useful in connection with the nontoxic stabilizing combinations of this invention. In such instances, the oils from which the fatty acids are derived may be hydrogenated. Also useful are the distilled fractionated fatty acid mixtures derived from such oils.

The preferred alkali metal salts are the sodium, potassium and lithium salts of monocarboxylic aliphatic fatty acids having from eight to eighteen carbon atoms.

The polyvalent metal salt is a salt of any monocarboxylic organic acid having from about six to about thirty carbon atoms. Any of such monocarboxylic acids mentioned above can be used. The acid can be the same acid as in the alkali metal salt, or different. Mixed acids and mixed polyvalent metal can be used.

Any polyvalent metal can be employed. The best results are obtained using manganese, zinc, cadmium, tin, copper, iron, cobalt or nickel, and of these, zinc, cadmium and tin are preferred. In nontoxic applications the zinc salts are preferred.

The zinc and cadmium aromatic acid salts give superior results, and will usually be used in preference to the aliphatic acid salts.

Any open chain aliphatic polyhydric alcohol or cycloaliphatic polyhydric alcohol containing from two to about ten hydroxyl groups and from about two to about twenty carbon atoms, can be employed as the polyol component of the stabilizer combinations of this invention. The preferred polyhydric alcohols are glycerol, mannitol, sorbitol, pentaerythritol, dipentaerythritol, methyl glucoside and anhydroenneaheptitol. Additional polyhydric alcohols that can be employed include tripentaerythritol, ethylene glycol, 1,2-propylene glycol, 1,3-propylene glycol, 1,2-butylene glycol, 1,3-butylene glycol, 1,4-butylene glycol, diethylene glycol and butyl glucoside, neopentyl glycol, ricinoleyl alcohol, 1,4-cyclohexane diol, and 1,4-cyclopentane diol.

The stabilizing combination of this invention will generally contain from about 15 to 50 parts alkali metal salt, from 15 to about 50 parts polyvalent metal salt and from about 20 to about 60 parts polyhydric alcohol, all by weight. From about 0.5 part to about 15 parts or more by weight of this stabilizing combination can be used to stabilize 100 parts by weight of polyvinyl chloride resin. The more stabilizing combination that is employed, the better the degree of stabilization. The best results are obtained when from about 3 to 10 parts of the stabilizing combination are employed per 100 parts of resin. More stabilizer combination than 15 parts by weight per 100 parts of resin can be employed, but is generally economically wasteful.

The stabilizing combinations of this invention impart an excellent stabilizing effect, and for most purposes can serve as the sole stabilizer in the polyvinyl chloride resin composition. Special requirements, i.e, a necessity to prevent clouding, may, however, make it desirable to employ supplemental stabilizers in conjunction with the stabilizer combinations of this invention, either in the stabilizer system or, alternatively, in the resin. Where the stabilized polyvinyl chloride resin compositions are to be used for food packaging, any supplementary stabilizers employed should be nontoxic in the amounts used. Any amount of supplementary stabilizer can be employed within the limits of the total amount of stabilizers used with the resin.

A preferred class of supplemental stabilizers are the organic phosphites. These contain aryl, alkyl, arylalkyl, alkaryl, cycloaliphatic, and heterocyclic groups having from one to twenty carbon atoms and from one to three heterocyclic atoms other than nitrogen. These phosphites are neutral, that is, all of the valences of the phosphorus atom are taken up with the said groups, which can be monovalent, bivalent or trivalent, as desired. Furthermore, these groups may be present in any combination. When bivalent or trivalent, they form heterocyclic rings of the type

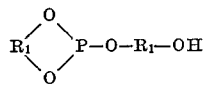

and may also form dimeric phosphites of the type

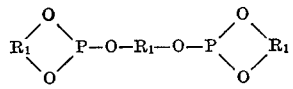

$R_1$ represents a bivalent group derived from a glycol or bisphenol. Exemplary are triphenyl phosphite, tricresyl phosphite, tri(dimethylphenyl)phosphite, tri-n-butyl phosphite, triisooctyl phosphite, tridodecyl phosphite, diisooctyl phenyl phosphite, neopentyl glycol phenyl phosphite, propylene glycol isooctyl phosphite, isooctyl diphenyl phosphite, tri(p-t-octylphenyl)phosphite, tri(p-t-nonylphenyl)phosphite, tri(p-t-nonyl-o-cresyl)phosphite, diethyleneglycol bis-butylene glycol bis-phosphite, tribenzyl phosphite, isobutyl dicresyl phosphite, isooctyl di(p-t-octylphenyl)phosphite, tri(2-ethylhexyl)phosphite, tri(2-cyclohexylphenyl)phosphite, tri-alpha-naphthyl phosphite, trifuryl phosphite, tritetrahydrofurfuryl phosphite, tricyclohexyl phosphite, and tricyclopentyl phosphite.

There also can be employed in conjunction with the stabilizing combination an anticlouding agent consisting of a polyvalent metal salt of a hydrocarbon-substituted phenol. The hydrocarbon substituent contains from four to twenty-four carbon atoms. The metal can be an alkaline earth metal or other polyvalent metal such as cadmium, bismuth, antimony, lead, zinc and tin. Among such polyvalent metal phenolates there can be mentioned the magnesium, barium, calcium, strontium, cadmium, lead, tin and zinc salts of n-butyl phenol, isoamyl phenol, isooctyl phenol, 2-ethylhexyl phenol, t-nonylphenol, n-decyl phenol, t-dodecyl phenol, t-octyl phenol, isohexyl phenol, octadecyl phenol, diisobutyl phenol, methyl propyl phenol, diamyl phenol, methyl isohexyl phenol, methyl t-octyl phenol, di-t-nonyl phenol, di-t-dodecyl phenol, and ortho- or para-phenyl phenol. The metal phenolate should be compatible with the resin and any plasticizers employed.

Also effective supplementary stabilizers are organic compounds containing at least one epoxy group. The amount can range from 0 to 100 parts by weight per 100 parts of resin, depending upon the effect desired, for many epoxy compounds are also plasticizers for polyvinyl chloride resins, as will be noted in the discussion which follows.

Any epoxy compound can be used. The compounds can be aliphatic or cycloaliphatic in character, but aromatic, heterocyclic and alicyclic groups can also be present. The epoxy compounds have from about 10 to about 150 carbon atoms. Some longer chain aliphatic compounds are also plasticizers. Typical epoxy compounds that have little or no plasticizing action are epoxy carboxylic acids such as epoxy stearic acid, epoxy erucic acid, glycidyl ethers of polyhydric alcohols and phenols, such as triglycidyl glycerine, diglycidyl ether of diethylene glycol, glycidyl epoxy stearyl ether, 1,4-bis(2,3-epoxy propoxy) benzene, 4,4'-bis(2,3-epoxypropoxy)diphenyl ether, 1,8-bis(2,3-epoxypropoxy)octane, 1,4-bis(2,3-epoxypropoxy) cyclohexane, and 1,3-bis(4,5-epoxy pentoxy)-5-chlorobenzene, the epoxy polyethers of polyhydric phenols, obtained by reacting a polyhydric phenol with a halogen-containing epoxide or dihalohydrin, such as the reaction products of resorcinol, catechol, hydroquinone, methyl resorcinol or polynuclear phenols such as 2,2-bis(4-hydroxyphenyl)propane (Bisphenol A), 2,2-bis(4-hydroxyphenyl)butane, 4,4'-dihydroxybenzophenone and 1,5-dihydroxy naphthalene with halogen-containing epoxides such as 3-chloro-1,2-epoxy butane, 3-chloro-1,2-epoxy octane, and epichlorhydrin. Typical epoxy compounds that combine stabilizing with plasticizing action are listed below under plasticizers.

Also useful as supplementary stabilizers are the organic phenols including the alkyl substituted phenols having from six to thirty carbon atoms of which up to twenty-four carbon atoms can be in the alkyl group. The phenol may contain one or more phenolic nuclei and one, two or more phenolic groups may be present. In addition, the phenolic nucleus may contain an amino group. The alkyl phenols may have from one to five alkyl radicals, preferably in the ortho or para positions to the phenolic group.

Exemplary of phenols in this class are phenol, resorcinol, catechol, eugenol, pyrogallol, cresol, alpha-naphthol beta-naphthol, p-octyl phenol, p-dodecyl phenol, p-octadecyl phenol, p-isooctyl-m-cresol, p-isohexyl-o-cresol, 2,6-ditertiary butyl phenol, 2,6-diisopropyl phenol, 2,6-ditertiary butyl-p-cresol, methylenebis-2,6-ditertiary butyl phenol, 2,2-bis(4-hydroxy phenyl)propane, methylenebis-p-cresol, 4,4'-thiobisphenol, 4,4'-thiobis(3-methyl-6-tertiary butyl phenol), 2,2-thiobis(4-methyl-6-tertiary butyl phenol), 2,6-diisooctyl resorcinol, 4-octyl pyrogallol, and 3,5-ditertiary butyl catechol. Among the aminophenols which can be used are 2-isooctyl-p-aminophenol, N-stearoyl-p-aminophenol, 2,6-diisobutyl-p-aminophenol, and N-ethylhexyl-p-aminophenol.

The invention is applicable to any polyvinyl chloride resin. The terms "polyvinyl chloride" as used here is inclusive of any polymer formed at least in part of the recurring group

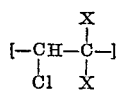

and having a chlorine content in excess of 40%. In this group, the X groups can each be either hydrogen or chlorine. In polyvinyl chloride homopolymers, each of the X groups is hydrogen. Thus, the term includes not only polyvinyl chloride homopolymers but also after-chlorinated polyvinyl chlorides such as those disclosed in British Patent No. 893,288 and also copolymers of vinyl chloride in a major proportion and other copolymerizable monomers in a minor proportion, such as copolymers of vinyl chloride and vinyl acetate, copolymers of vinyl chloride with maleic or fumaric acids or esters, and copolymers of vinyl chloride with styrene. The invention also is applicable to mixtures of polyvinyl chloride in a major proportion with a minor proportion of other synthetic resins such as chlorinated polyethylene or a copolymer of acrylonitrile, butadiene and styrene.

The stabilizing combinations of this invention, both with and without supplementary stabilizers, are excellent stabilizers for both plasticized and unplasticized polyvinyl chloride resins. When plasticizers are to be employed, they may be incorporated into the polyvinyl chloride resins in accordance with conventional means. The conventional plasticizers can be used, such as dioctyl phthalate, dioctyl sebacate and tricresyl phosphate. Where a plasticizer is employed, it can be used in an amount within the range from 0 to 100 parts by weight of the resin.

Particularly useful plasticizers are the epoxy higher esters having from about 20 to about 150 carbon atoms. Such esters will initially have had unsaturation in the alcohol or acid portion of the molecule, which is taken up by the formation of the epoxy group.

Typical unsaturated acids are oleic, linoleic, linolenic, erucic, ricinoleic and brassidic acids, and these may be esterified with organic monohydric or polyhydric alcohols, the total number of carbon atoms of the acid and the alcohol being within the range stated. Typical monohydric alcohols include butyl alcohol, 2-ethylhexyl alcohol, lauryl alcohol, isooctyl alcohol, stearyl alcohol, and oleyl alcohol. The octyl alcohols are preferred. Typical polyhydric alcohols include pentaerythritol, glycerol, ethylene glycol, 1,2-propylene glycol, 1,4-butylene glycol, neopentyl glycol, ricinoleyl alcohol, erythritol, mannitol and sorbitol. Glycerol is preferred. These alcohols may be fully or partially esterified with the epoxidized acid. Also useful are the epoxidized mixtures of higher fatty acid esters found in naturally-occurring oils such as epoxidized soybean oil, epoxidized olive oil, epoxidized cottonseed oil, epoxidized tall oil fatty acid esters, epoxidized coconut oil and epoxidized tallow. Of these, epoxidized soybean oil is preferred.

The alcohol can contain the epoxy group and have a long or short chain, and the acid can have a short or long chain, such as epoxy stearyl acetate, epoxy stearyl stearate, glycidyl stearate, and polymerized glycidyl methacrylate.

A small amount, usually not more than 0.1% by weight of the composition, of a parting agent also can be included. Typical parting agents are the higher aliphatic acids, including the halogenated acids, having from twelve to twenty-four carbon atoms, such as stearic acid, pentachlorostearic acid, lauric acid, palmitic acid and myristic acid, mineral lubricating oils, polyvinyl stearate, polyethylene and paraffin wax.

The preparation of the stabilized polyvinyl chloride resin composition is easily accomplished by conventional procedures. The selected stabilizer combination is mixed with the plasticizer, if any, and then is blended with the polyvinyl chloride resin using, for example, plastic mixing rolls, at a temperature at which the mix is fluid and thorough blending facilitated, milling the plasticizer, if any, and stabilizers with the resin on a two-roll mill at from 250° to 450° F. for a time sufficient to form a homogeneous sheet. Usually, 5 minutes milling time is adequate. After the mass is uniform, it is sheeted out in the usual fashion.

The following examples in the opinion of the inventor constitute preferred embodiments of his invention.

EXAMPLE 1

A series of polyvinyl chloride homopolymer formulations was prepared having the following composition:

Plastic compositions— Parts by weight
Geon 103 Ep (homopolymer of polyvinyl chloride) _____ 150
Dipentaerythritol _____ 1.5
Diphenyl mono-isooctyl phosphite _____ 1.5
Salt of organic carboxylic acid as noted in Table I _____ 3

The diphenyl mono-2-ethylhexyl phosphite, dipentaerythritol and acid salt were mixed together and then blended with the polyvinyl chloride. The mixture was then heated in an oven at 350° F. and sheeted off, and samples where then heated in an oven at 350° F. and at 375° F. for two hours to test heat stability. The discoloration was noted at 15 minutes intervals, and is noted in Tables I and II below.

TABLE I
(Heat Stability at 350° F.)

| Time of Heating (Minutes) | A Zinc Stearate | B Zinc Stearate 2.5; Potassium Laurate 0.5 | C Zinc Stearate 2.0; Potassium Laurate 1.0 | D Cadmium Benzoate 3.0 | E Cadmium Benzoate 2.5; Potassium Laurate 0.5 |
|---|---|---|---|---|---|
| Initial | Colorless | Colorless | Colorless | Colorless | Colorless. |
| 15 | Pale yellow | Pale yellow | Yellow | do | Do. |
| 30 | do | do | do | Very pale yellow | Do. |
| 45 | do | do | do | do | Do. |
| 60 | Black | do | do | Pale yellow | Do. |
| 75 | do | do | do | do | Very pale yellow. |
| 90 | do | do | do | do | Do. |
| 105 | do | Black | do | do | Do. |
| 120 | | | do | Yellow with dark edges | Do. |

| Time of Heating (Minutes) | F Cadmium Benzoate 2.0; Potassium Laurate 1.0 | G Cadmium Benzoate 1.5; Potassium Laurate 1.5 | H Cadmium Benzoate 2.0; Potassium Laurate 1.0. (No Dipentaerythritol) | I Cadmium Benzoate 2.0; Potassium Laurate 1.0 (No Phosphite) |
|---|---|---|---|---|
| Initial | Colorless | Colorless | Colorless | Pale pink. |
| 15 | do | Pale yellow | do | Pale buff. |
| 30 | do | do | do | Do. |
| 45 | do | do | Very pale yellow | Do. |
| 60 | do | do | do | Do. |
| 75 | Very pale yellow | Yellow | Pale yellow | Do. |
| 90 | do | do | do | Do. |
| 105 | do | do | do | Do. |
| 120 | do | do | do | Do. |

Example A shows that the zinc stearate alone in this combination and in these proportions gives stabilization for only 45 minutes.

A mixture of zinc stearate and potassium laurate in the same total amount of salt, containing only 0.5 part of potassium laurate in the same total amount of salt, containing only 0.5 part of potassium laurate (Example B), is very much better, giving good resistance to discoloration through 90 minutes of heating, even though the initial color is not quite as good. Increasing the amount of potassium laurate to one part, as shown by Example C, extends the duration of the stabilization to more than 120 minutes or two hours.

Example D shows the effect of cadmium benzoate alone. It is quite a good stabilizer, considerably superior to zinc stearate. However, the alkali metal fatty acid salt of the combination is capable of greatly improving the stability of cadmium benzoate. As shown in Example E, using only 0.5 part of potassium laurate gives improved resistance to discoloration, as shown by a lower intensity of color beyond 45 minutes of heating. In fact, only a very slight color is noticeable after 60 minutes of heating. Similar improvement is obtained in Example F, using a slightly larger amount of potassium laurate.

Example G shows that an excessive amount of alkali metal salt leads to an increase of color, rather than a reduction, showing that only small amounts are desirable in order to obtain the enhanced result in accordance with the invention. However, even in this gate, the stabilization obtained is far superior to that of zinc stearate.

Example H is included as a control to show the effect of the phosphite only, without the dipentaerythritol.

Example 1 shows the effect of the dipentaerythritol without the phosphite. The dipentaerythritol without phosphite imparts an initial color, which is somewhat discharged on heating but which is never entirely eliminated. The advantage of the phosphite, therefore, is in overcoming the color. However, where a slight off-color of this type can be tolerated, as in colored polyvinyl chloride compositions, the formulation is quite effective, since good stabilization is obtained through two hours of heating.

The data at 375° F. shows that the stabilizing salts of the invention are still quite effective under these rigorous conditions.

Example F retains good color through 75 minutes, and Example G through 60 minutes, of heating. Example H is really not satisfactory beyond 45 minutes, while Example I is satisfactory up to 60 minutes.

EXAMPLE 2

A series of polyvinyl chloride homopolymer formulations was prepared having the following composition:

Plastic composition— Parts by weight
Geon 103 Ep (homopolymer of polyvinyl chloride) _____ 150
Di-phenyl mono-2-ethylhexyl phosphite _____ 1.5
Dipentaerythritol _____ 1.5
Metal salt as noted in Table III _____ 3

The dipentaerythritol, phosphite and metal salt were mixed together and then blended with the polyvinyl chloride. The mixture was heated on a 2-roll mill up to 350° F. and sheeted off, and samples were then heated in an oven at 375° F. for two hours to test heat stability.

The discoloration was noted at 15 minute intervals as reported in Table III below.

TABLE III
(Heat Stabilization at 375° F.)

| Time of Heating (Minutes) | J<br>Zinc Stearate 3.0 | K<br>Zinc Stearate 3.0; Sodium Laurate 0.5 | L<br>Zinc Stearate 2.0; Sodium Laurate 1.0 | M<br>Cadmium Benzoate 3.0 | N<br>Cadmium Benzoate 2.5; Sodium Laurate 0.5 | O<br>Cadmium Benzoate 2.0; Sodium Laurate 1.0 | P<br>Cadmium Benzoate 1.5; Sodium Laurate 1.5 |
|---|---|---|---|---|---|---|---|
| Initial | Pale yellow | Pale yellow | Pale yellow | Colorless | Colorless | Colorless | Colorless |
| 15 | do | Yellow | Yellow | Very pale yellow | do | do | Do. |
| 30 | Black | do | do | do | Very pale yellow | Very pale yellow | Very pale yellow |
| 45 | | Black | do | do | Pale yellow | do | Do. |
| 60 | | | do | Very pale yellow | do | do | Do. |
| 75 | | | Black | Yellow with black edges | do | Pale yellow | Pale yellow |
| 90 | | | | Black | do | do | Do. |
| 105 | | | | | Yellow with black edges | Orange | Orange |
| 120 | | | | | Black | Black | Black |

Example J shows the effectiveness of zinc stearate at the rather high test temperature of 375° F. Good stabilization is obtained for only 15 minutes. Substitution of even as little as 0.5 part of sodium laurate (Example K) doubles this time, at a slight cost in color, and Example L shows that one part of sodium laurate improves stabilization for 60 minutes, again at the expense of color. However, this is not a disadvantage in colored compositions, where this discoloration would be masked.

Example M shows the effectiveness of cadmium benzoate. This alone is capable of imparting good stability for one hour.

0.5 part of sodium laurate, as shown in Example M, increases this by 50%, giving good stabilization for 90 minutes. This same effect is obtained with higher proportions of sodium laurate as per Examples N, O and P.

TABLE II
(Heat Stabilization at 375° F.)

| Time of Heating (Minutes) | F<br>Cadmium Benzoate 2.0; Potassium Laurate 1.0 | G<br>Cadmium Benzoate 1.5; Potassium Laurate 1.5 | H<br>Cadmium Benzoate 2.0; Potassium Laurate 1.0 (No Dipentaerythritol) | I<br>Cadmium Benzoate 2.0; Potassium Laurate 1.0 (No phosphite) |
|---|---|---|---|---|
| Initial | Colorless | Colorless | Colorless | Pale pink |
| 15 | do | Pale yellow | Pale yellow | Pale buff |
| 30 | Very pale yellow | do | do | Do. |
| 45 | do | do | do | Do. |
| 60 | do | do | Orange with black spots | Buff |
| 75 | Pale yellow | Orange | Black | Yellow with brown edges |
| 90 | Orange | Black | | |
| 105 | Black | | | |

EXAMPLE 3

A series of polyvinyl chloride homopolymer formulations was prepared, having the following composition:

| Plastic Composition | Parts by weight | | | | |
|---|---|---|---|---|---|
| | Q | R | S | T | U |
| Geon 103 Ep (homopolymer of polyvinyl chloride) | 150 | 150 | 150 | 150 | 150 |
| Mono-phenyl diisooctyl phosphite | 1.5 | 1.5 | 1.5 | 1.5 | 1.5 |
| Dipentaerythritol | 1.5 | 1.5 | 1.5 | 1.5 | 1.5 |
| Stannous 2-ethyl hexoate | 3.0 | 2.5 | 2.0 | 1.0 | 2.0 |
| Sodium laurate | | 0.5 | 1.0 | 2.0 | |
| Potassium larurate | | | | | 1.0 |

The phosphite, dipentaerythritol, stannous octoate and sodium or potassium laurate were mixed together, and blended with the polyvinyl chloride. The mixture was heated on a 2-roll mill up to 350° F. and sheeted off, and samples were then heated in an oven at 375° F. for one hour to test heat stability. The discoloration was noted at 15 minute intervals.

The stannous octoate (Example Q), gave no stability, turning black after 15 minutes of heating.

Examples R, S, T and U imparted good stability with a yellow color up to 60 minutes of heating.

EXAMPLE 4

A series of polyvinyl chloride homopolymer formulations was prepared having the following composition:

Plastic composition— Parts by weight
- Geon 103 Ep (homopolymer of polyvinyl chloride) _____ 150
- Iso-octyl diphenyl phosphite _____ 1.5
- Dipentaerythritol _____ 1.5
- Salt as noted in Table IV _____ 3.0

The dipentaerythritol, isooctyl diphenyl phosphite and metal salt were mixed together, and blended with the polyvinyl chloride. The mixture was then heated on a 2-roll mill up to 350° F. and sheeted off, and samples were then heated in an oven at 375° F. for up to 2 hours to test heat stability.

Stability was noted at 15 minute intervals, as reported in Table IV below.

Example V shows that the combination of potassium laurate and cadmium laurate gives excellent stability and good color through 75 minutes of heating. Using a slightly less amount of cadmium laurate (W) reduces the stability to 45 minutes.

Examples X and Y show that the combination of zinc naphthoate and potassium laurate is desirable, since it gives good color retention for up to 45 minutes. Example Z shows the composition of cadmium laurate and sodium laurate in the same amounts of D gives the same order of stabilization.

EXAMPLE 5

A series of polyvinyl chloride homopolymer formulations was prepared, having the following composition:

Plastic composition— Parts by weight
- Geon 103 Ep (homopolymer of polyvinyl chloride) _____ 150
- Diisooctyl mono-phenyl phosphite _____ 1.5
- Dipentaerythritol _____ 1.5
- Metal salt as noted in Table V _____ 3.0

The phosphite, dipentaerythritol and metal salt were mixed together, and then blended with the polyvinyl chloride. The mixture was heated on a 2-roll mill up to 350° F. and sheeted off, and samples were then heated in an oven at 375° F. for one and one-half hours to test heat stability. The discoloration was noted at 15 minute intervals, as reported in Table V below:

TABLE V

| Time of Heating (Minutes) | AA | BB | CC | DD | EE | FF | GG | HH |
|---|---|---|---|---|---|---|---|---|
| | Zinc Stearate 2.0; Sodium Epoxy Stearate 1.0 | Zinc Stearate 2.0; Lithium Laurate 1.0 | Zinc Stearate 2.0; Rubidium Laurate 1.0 | Zinc Stearate 2.0; Cesium Laurate 1.0 | Cadmium Benzoate 2.0; Sodium Epoxy Stearate 1.0 | Cadmium Benzoate 2.0; Lithium Laurate 1.0 | Cadmium Benzoate 2.0; Rubidium Laurate 1.0 | Cadmium Benzoate 2.0; Cesium Laurate 1.0 |
| Initial | Pale yellow | Very pale yellow | Pale yellow | Very pale yellow | Clear | Clear | Clear | Clear |
| 15 | Yellow | Pale yellow | Yellow | Yellow | Very pale yellow | Very pale yellow | Very pale yellow | Very pale yellow |
| 30 | Pale yellow | do | do | do | do | do | Pale yellow | do | Do. |
| 45 | do | do | Black | Pale yellow | do | do | do | Do. |
| 60 | Black | Yellow with black edges | | Black | Pale yellow | do | Yellow with black edges | Pale yellow |
| 75 | | Black | | | do | Yellow with black spots | Black | Yellow |
| 90 | | | | | Orange with black spots | Black | | Black |
| 105 | | | | | Black | | | |

Example AA in Table V shows the considerably enhanced effect with zinc stearate in the presence of sodium epoxy stearate. This should be compared with Example J of Table III for a control run using zinc stearate alone at 375° F. The sodium epoxy stearate extended the period at which good color is obtained to beyond 45 minutes.

Example BB, with lithium laurate, is slightly better, giving stability for the same 45 minute period, but with better color.

Example CC, with rubidium laurate, proved to be slightly inferior, giving good color for only 30 minutes. Example DD shows that cesium laurate gives as long stability as lithium laurate.

Example EE is to be compared with Example M of Table III, showing cadmium benzoate alone as a control. The sodium epoxy stearate is effective in extending the

TABLE IV

| Time of Heating (Minutes) | V | W | X | Y | Z |
|---|---|---|---|---|---|
| | Cadmium Laurate 2.88; Potassium Laurate 1.0 | Cadmium Laurate 2.0; Potassium Laurate 1.0 | Zinc Napthoate 1.29; Potassium Laurate 1.0 | Zinc Naphthoate 2.0; Potassium Laurate 1.0 | Cadmium Laurate 2.88; Sodium Laurate 2.0 |
| Initial | Pale yellow | Colorless | Colorless | Colorless | Colorless |
| 15 | do | Pale yellow | Pale yellow | Pale yellow | Pale yellow |
| 30 | do | do | do | do | Do. |
| 45 | do | do | do | Black | Do. |
| 60 | do | Orange | Black | | Do. |
| 75 | do | Black | | | Yellow with black edges. |
| 90 | Orange | | | | Yellow with black spots. |
| 105 | Black | | | | Black. | useful stability period to 75 minutes, as compared to 60 minutes for the control.

Example FF shows the effectiveness of lithium laurate. In this case, the stabilization is superior to cadmium benzoate because of the improved color at each heating state. Example HH shows that cesium laurate is the equivalent of lithium laurate in this respect. The rubidium laurate of Example GG is slightly inferior.

I claim:

1. A polyvinyl chloride resin stabilizer combination capable of improving the resistance of polyvinyl chloride resins to heat deterioration, comprising from about 20 to about 60 parts by weight of a polyhydric alcohol selected from the group consisting of aliphatic and cycloaliphatic polyhydric alcohols containing from about two to about ten hydroxyl groups, and from about two to about twenty carbon atoms, from about 15 to about 50 parts by weight of an alkali metal salt of an organic carboxylic acid having from two to about thirty carbon atoms, and from about 15 to about 50 parts by weight of a salt of a polyvalent metal selected from the group consisting of zinc, cadmium and tin and an organic monocarboxylic acid having from about six to about thirty carbon atoms.

2. A polyvinyl chloride resin stabilizer combination as in claim 1 wherein the polyvalent metal is zinc.

3. A polyvinyl chloride resin stabilizer combination as in claim 1 wherein the polyvalent metal is cadmium.

4. A polyvinyl chloride resin stabilizer combination as in claim 1 wherein the polyvalent metal is tin.

5. A polyvinyl chloride resin stabilizer combination as in claim 1 wherein the alkali metal is sodium.

6. A polyvinyl chloride resin stabilizer combination as in claim 1 wherein the alkali metal is potassium.

7. A polyvinyl chloride resin stabilizer combination as in claim 1 wherein the polyhydric alcohol is pentaerythritol.

8. A polyvinyl chloride resin stabilizer combination as in claim 1 wherein the polyhydric alcohol is dipentaerythritol.

9. A polyvinyl chloride resin stabilizer system as in claim 1 wherein the polyhydric alcohol, the alkali metal salt and the polyvalent metal salt are all nontoxic in the amounts employed.

10. A polyvinyl chloride resin stabilizer combination as in claim 1 wherein the carboxylic acids used to form the salts are aliphatic fatty acids derived from edible fats and oils.

11. A polyvinyl chloride resin stabilizer combination as in claim 1 comprising an organic triphosphite having all of the valences of the phosphorus taken up with groups having from one to about twenty carbon atoms, and selected from the group consisting of aryl, alkyl, arlalkyl, alkaryl, cycloaliphatic and heterocyclic groups having from one to three heterocyclic atoms other than nitrogen, the groups being connected to the phosphorus through an oxygen atom.

12. A polyvinyl chloride resin composition having increased resistance to heat deterioration comprising a polyvinyl chloride resin and a stabilizer combination comprising from about 20 to about 60 parts by weight of a polyhydric alcohol selected from the group consisting of aliphatic and cycloaliphatic polyhydric alcohols containing from about two to about ten hydroxyl groups, and from about two to about twenty carbon atoms, from about 15 to about 50 parts by weight of an alkali metal salt of an organic carboxylic acid having from two to about thirty carbon atoms, and from about 15 to about 50 parts by weight of a salt of a polyvalent metal selected from the group consisting of zinc, cadmium and tin, and an organic monocarboxylic acid having from about six to about thirty carbon atoms, the stabilizer combination being in an amount within the range from at least about 0.5 part up to about 15 parts per hundred parts by weight of the polyvinyl chloride resin, sufficient to increase the resistance of the resin to heat deteroration.

13. A polyvinyl chloride resin composition as in claim 12, wherein the polyvinyl chloride resin is a polyvinyl chloride homopolymer.

14. A polyvinyl chloride resin stabilizer combination as in claim 12 wherein the polyvinyl chloride resin is a copolymer of vinyl chloride and vinyl acetate.

15. A polyvinyl chloride resin composition as in claim 12 wherein the polyvinyl chloride resin is an after-chlorinated polyvinyl chloride resin.

16. A polyvinyl chloride resin composition according to claim 12 wherein the polyvalent metal is tin.

17. A polyvinyl chloride resin composition according to claim 12 wherein the polyvalent metal is zinc.

18. A polyvinyl chloride resin composition according to claim 12 wherein the polyvalent metal is cadmium.

References Cited

UNITED STATES PATENTS

| | | | |
|---|---|---|---|
| 2,446,976 | 8/1948 | Cousins | 260—45.75 |
| 2,564,646 | 8/1951 | Leistner | 260—45.75 |
| 3,003,999 | 10/1961 | Kauder | 260—45.75 |

DONALD E. CZAJA, *Primary Examiner.*

H. E. TAYLOR, JR., *Assistant Examiner.*

U.S. Cl. XR

252—400, 404, 407; 260—28.5, 45.7, 45.75, 45.8, 45.85, 45.95

UNITED STATES PATENT OFFICE
CERTIFICATE OF CORRECTION

Patent No. 3,453,225                                                  July 1, 1969

Mark W. Pollock

It is certified that error appears in the above identified patent and that said Letters Patent are hereby corrected as shown below:

Column 1, line 33, "Leister" should read -- Leistner --. Column 2, line 26, "proply" should read -- propyl --; line 35, at the end of the line, after "ricinoleic" insert -- acid --. Column 4, line 75, "terms" should read -- term --. Column 6, line 49, "where" should read -- were --; line 51, "minutes" should read -- minute --; same column 6, Table I, under heading for "I", opposite "60", "Do" should read -- Light buff --, so that for 60, 75, 90, 105 and 120 minutes of heating the color is "Light buff". Column 7, lines 5 and 6, cancel "containing only 0.5 part of potassium laurate in the same total amount of salt,"; line 48, "gate" should read -- case --; same column 7, Table II, under heading for "G", "Blaek" should read -- Black --. Column 8, line 15, after "ride" insert -- ) --. Column 9, line 14, last line of Table, "larurate" should read -- laurate --.

Signed and sealed this 19th day of May 1970.

(SEAL)
Attest:

EDWARD M. FLETCHER, JR.                            WILLIAM E. SCHUYLER, JR.
Attesting Officer                                         Commissioner of Patents